UNITED STATES PATENT OFFICE.

ADOLF WILHELM KARL WITTE, OF HAMBURG, GERMANY.

PROCESS FOR MAKING BUTTER.

1,039,627. Specification of Letters Patent. Patented Sept. 24, 1912.

No Drawing. Application filed November 19, 1909. Serial No. 528,848.

*To all whom it may concern:*

Be it known that I, ADOLF WILHELM KARL WITTE, merchant, a subject of the German Emperor, residing at Alsterdamm 1, Hamburg, Germany, have invented certain new and useful Improvements in Processes for Making Butter, of which the following is a specification.

The present invention relates to an improved process of making butter from cream, milk or the like, and the object of the invention is to obtain an increased yield in butter than hitherto possible with the aid of the known butter making processes.

The present improved process is as follows: The milk or cream immediately after having been obtained, is pasteurized, if desired, in a well known manner, and then at once greatly cooled down to from somewhat above freezing point to 2° centigrade, care being taken not to permit the temperature to reach the freezing point. The milk or cream is maintained at this low temperature for about 24 hours, and it is important that the temperature be maintained strictly uniform within the limits above given during the entire cooling period, and the milk or cream should under no circumstances be stirred or disturbed in any way. At the end of the time stated the milk or cream is quickly warmed to between 18° and 20° C.; such heating is to be done artificially and in a manner acting very promptly. As soon as the milk or cream reaches this temperature a souring material or "starter" (pure culture) is added in the proportion of about 10% of the weight of the milk or cream. The "starter" should be allowed to act from 4 to 6 hours, during which time the temperature should be uniformly maintained at between 18° and 20° C. At the end of this period a further quantity of "starter" is added, also in the proportion of 10% of the treated milk or cream. Or, in other words, the starter is to be added in two portions at intervals of from four to six hours. After the second addition of "starter" the milk or cream is cooled down to between 10° and 13° C. At this temperature the cream is allowed to ripen or mature, for from 18 to 20 hours. As in the other instances, the temperature should be maintained strictly uniform within the given limits. At the end of the ripening or maturing period the milk or cream may be churned in the usual manner, so that the butter making proper may take place at about 48 hours from the beginning of cooling down the milk or cream to somewhat above freezing point.

I claim—

1. The herein described process of treating milk, cream, and the like for producing an increased yield in butter, which consists in cooling the material to be treated down to a temperature of from somewhat above freezing point to 2° C., maintaining it at this temperature for about 24 hours, quickly warming it to a temperature of 18° to 20° C., adding a souring generator or "starter", and immediately churning the material thus treated, when it is ripe.

2. The process of making butter, which comprises cooling the milk, cream, and the like to be treated to a temperature slightly above freezing point and maintaining it at such low temperature for about 24 hours, then quickly raising the temperature to between 18° and 20° C., adding starter, maintaining the said raised temperature for about four to six hours, again adding starter, then cooling the temperature to between 10° to 13° C., ripening the material thus treated at this temperature for about 18 to 20 hours, and churning it about 48 hours after the beginning of the cooling.

3. The herein described process of treating milk, cream, and the like, which consists in pasteurizing the material to be treated, subsequently cooling it down to a temperature of from somewhat above freezing point to 2° C., maintaining it at this temperature for a period of not less than about 24 hours, quickly heating it to a temperature of about 18° to 20° C., adding to it at intervals portions of starter, and churning the milk when it is ripe.

In testimony, that I claim the foregoing as my invention I have signed my name in presence of two subscribing witnesses.

ADOLF WILHELM KARL WITTE.

Witnesses:
GEORG PINKNEY,
ALFRED H. NATHAN.

Copies of this patent may be obtained for five cents each, by addressing the "Commissioner of Patents, Washington, D. C."